United States Patent
Yaroslavtsev

(10) Patent No.: US 6,526,847 B1
(45) Date of Patent: Mar. 4, 2003

(54) CONNECTING ROD-PISTON ASSEMBLY

(76) Inventor: Alexandr Pavlovich Yaroslavtsev, ut, 40 let Pobedy, 108-204, Tollyatti (RU), 445039

( * ) Notice: Subject to any disclaimer, the term of this patent is extended or adjusted under 35 U.S.C. 154(b) by 0 days.

(21) Appl. No.: 09/831,183
(22) PCT Filed: Nov. 15, 1999
(86) PCT No.: PCT/RU99/00432
§ 371 (c)(1), (2), (4) Date: May 5, 2001
(87) PCT Pub. No.: WO00/31443
PCT Pub. Date: Jun. 2, 2000

(51) Int. Cl.$^7$ ................................................. F16J 1/14
(52) U.S. Cl. ..................................................... 74/579 R
(58) Field of Search ........................... 74/519, 579 R; 123/46 SC, 193.6, 197.2, 197.3, 193.4

(56) References Cited

U.S. PATENT DOCUMENTS

| | | | | |
|---|---|---|---|---|
| 1,856,107 A | * | 5/1932 | Mellor | 123/41.38 |
| 2,687,931 A | * | 8/1954 | Flynn, Jr. | 92/186 |
| 3,930,472 A | * | 1/1976 | Athenstaedt | 123/41.38 |
| 4,083,292 A | * | 4/1978 | Goloff | 92/176 |
| 4,662,319 A | * | 5/1987 | Ayoul | 123/41.35 |
| 5,046,930 A | * | 9/1991 | Lindstrom | 417/366 |
| 5,913,960 A | * | 6/1999 | Fletcher-Jones | 92/219 |
| 6,209,510 B1 | * | 4/2001 | Brogdon et al. | 123/197.4 |
| 6,334,385 B1 | * | 1/2002 | Wilksch et al. | 92/159 |

* cited by examiner

Primary Examiner—David A. Bucci
Assistant Examiner—Vicky A. Johnson
(74) Attorney, Agent, or Firm—Law Offices of Michael Dryja

(57) ABSTRACT

A connecting rod-piston assembly, particularly for internal combustion engines, allows to increase an intercenter distance of a connecting rod without increasing an assembly overall dimensions, reduce an angle of the connecting rod swinging and reduce a side force.

Proposed assembly consists of the piston and the connecting rod. An upper end of the connecting rod has a form of a bowl-shaped element, truncated along the width of the connecting rod. Inside of said piston there is a wide partition, in which there is made inner spherical cavity with the side walls on the ends of the cavity on one side of the partition with the possibility to contact by said side walls with a rectilinear truncated edge of the bowl-shaped element witting the working angle of swinging of the connecting rod. A central channel, through which a connecting rod blade passes, is lapped by the bulkhead from a flank of the side walls. Said bulkhead connects the side walls, opposite parts of the piston, increases the piston strength and takes a part of tensile forces of inertia of the piston. The bulkhead is made as a unit with the piston and reinforced by a plate of a strong material during the piston casting; the strong material ring is mounted on the end of the piston partition and embraces said partition.

1 Claim, 1 Drawing Sheet

Connecting rod-piston assembly Field of Invention

CONNECTING ROD-PISTON ASSEMBLY

The present invention relates to an engine manufacturing and particularly to a connecting rod-piston assembly device.

BACKGROUND OF THE INVENTION

In well-known construction of the connecting rod-piston assembly, the connection of the piston with the connecting rod is made by means of a piston pin in the form of a cylinder ("Automobile VAZ", by Vershigora V. A.)

The disadvantage of such connection consists in that the axis of said piston pin is on the piston under a groove for the piston ring, which leads to the increasing of an overall engine dimension. In order to reduce such dimensions it is necessary to reduce the connecting rod length, but this action increases the mechanical loss. The present invention partially resolves this contradiction: such as, it provides the connecting rod-piston assembly, having small dimensions, but, at the same time, with greater theoretical length of the connecting rod.

The device, disclosed in Patent Application N°97102529/06, filed on Feb. 18, 1997, ICL 6 F6J 1/22, named "Connecting rod-piston unit", is taken as a prototype and has the similar technical essence.

The disadvantage of known device is an insufficient strength of an assembly on high revolutions of an engine. By increasing revolutions, the inertial loads increase sharply and, when the inertia forces of the piston are directed to the combustion chamber side and it is providing an assembly extension, a cross component force is appearing in said spherical connection of the connecting rod-piston, which deforms a skirt in this direction within the limits of the elastic deformation. As a result, the skirt diameter increases, the piston begins to stick within the cylinder and the mechanical loss increases.

SUMMARY OF THE INVENTION

Technical target of this invention is a simultaneous increasing piston strength and reducing cross component force, which leads to the skirt deformation.

Technical result is achieving by making an upper end of the connecting rod in said assembly in the form of a bowl-shaped element with straight truncated edges along the connecting rod width and with outer and inner spherical surfaces, the centres of which are located from a side of the engine combustion chamber. There is a partition in said piston with a cavity, made in the form of a slit, having big and small spherical surfaces with the side walls. At the ends of said cavity on one side of the partition there are side walls, which contact with one straight-line edge of said truncated bowl-shaped element of the connecting rod within the limits of a working swinging node of the connecting rod. There is also a channel, made in the partition to open a part of the cavity to pass a connecting rod blade there through. A bulkhead, being a part of a big sphere of the piston, is made on the piston partition, on the flank of said side walls from the big sphere of the piston to the piston skirt side. Said bulkhead connects said side walls and two opposite regions of the piston big sphere and partially shuts off the central channel of the piston parallel to the straight-line truncated edge of the connecting rod from the flank of the side walls and laps by its big sphere surface over the surface of the connecting rod outer sphere with the possibility of intercontacting on the width from the straight-line truncated edge of the bowl-shaped element to the connecting rod blade. The bulkhead and side walls, during a piston blank casting, are reinforced with strong material in the form of a thin plate, mounted along the piston partition and connecting side walls. On the piston partition end from the side of the piston skirt along its perimeter there is a groove, where there is positioned a ring of strong material, which embraces said piston partition together with the bulkhead and side walls. This groove is expanded after said unit assembling.

The bulkhead, made on the piston partition, increases the piston skirt strength in the lateral direction and simultaneously reduces side force, which deforms said piston skirt. The bulkhead, having big spherical surface, made on it, takes a part of the tensile forces of inertia, and while the angle of said forces application in the centre of the bulkhead is zero, a total cross component of these forces is reducing significantly. The bulkhead and piston side walls, reinforced by the plate, and the ring of strong material, embracing said partition, increase the strength of the piston skirt in the direction of cross forces of inertia. The whole unit in assembly is a balanced construction.

Suggested device allows not only the increasing of piston strength in the cross direction, but significantly reduces those forces, which act in this direction, that the lateral deformations of piston from the tensile forces of inertia reduce sharply for about the order and it is appearing a to utilize said spherical connection of the piston with the connecting rod in a high-speed engines. So, said device has an increased strength and improves the technical-and-economic index of an internal combustion engine.

DETAILED DESCRIPTION OF THE PREFERRED EMBODIMENT

Figure 1:
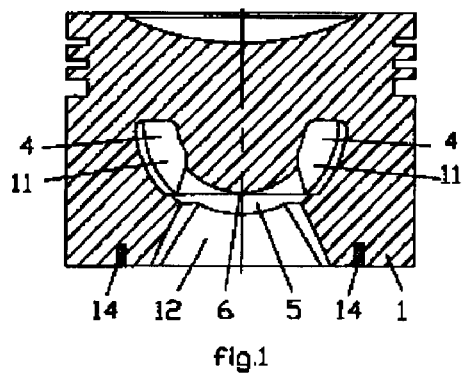
FIGS. 1 and 2 are longitudinal sectional views of the piston.
Figure 2:
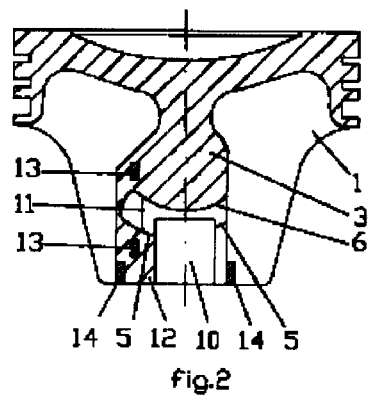
Figure 4:
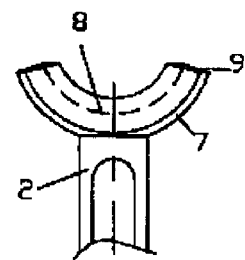
FIG. 4 is a longitudinal sectional view of the connecting rod.
Figure 5:
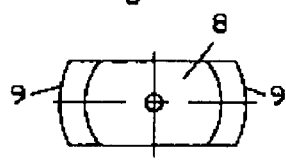
FIG. 5 is a plan view of said connecting rod.
Figure 3:
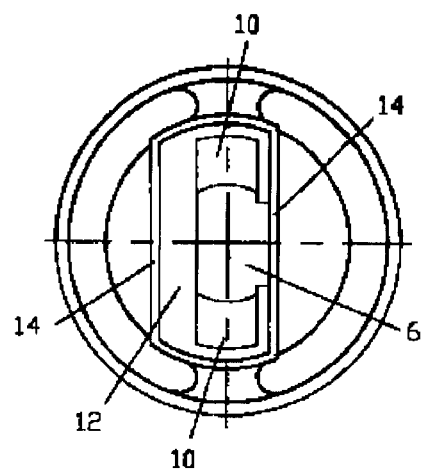
FIG. 3 is a bottom view of said piston.

The connecting rod-piston unit consists of a piston 1 and a connecting rod 2. In the piston 1 there is a wide partition 3 with inner cavity 4, provided between a big sphere 5 and a small sphere 6. An upper end of the connecting rod 2 is made as a bowl-shaped element with outer and inner spherical surfaces 7 and 8, respectively. Said bowl-shaped element is truncated along the connecting rod width and has an elongated end in the form of lobes 9. The connecting rod 2 is mounted within the central channel 10. The upper end of the connecting rod is placed within the cavity 4 with the possibility to contact by means of the surfaces 7 and 8 along the spherical surfaces 5 and 6 and by means of one rectilinear edge of the bowl-shaped element of the connecting rod with the side walls 11. Opposite sections of big sphere 5 of the piston 1 and said side walls 11 are connected by a bulkhead, which partially shuts the central channel 10 of the piston 1 and laps by its sphere surface 5 over the surface 7 of the outer sphere of the connecting rod with the possibility of interconnecting on the width from the rectilinear truncated edge of the bowel-shaped element to the connecting rod blade. The bulkhead 12 is reinforced by the plate 13, and on the end of the partition 3 there is made a groove, in which a ring 14 is positioned. The whole unit is a balanced construction.

INDUSTRIAL USE OF THE INVENTION

During the engine operation, the lobes 9 of the bowl-shaped element of the connecting rod 2 are displacing within the spherical cavity of the piston 4, performing the oscillating motions within the limits of the swinging working node of the connecting rod 2. All loads are transmitting from the piston to the connecting rod 2 and backwards across the spherical surfaces 5 and 6 of the piston 1 and spherical surfaces 7 and 8 of the bowl-shaped element of the connecting rod. The spherical surface 5 of the piston 1, provided simultaneously on opposite regions of the piston 1 and the bulkhead 12, has an increased stiffness and transmits the piston force of inertia onto the connecting rod bowl-shaped element with minimum deformations of the piston 1 even at high revolutions of the engine, owing to the reducing of the tensile forces of inertia with the help of the bulkhead 12.

What is claimed is:

1. A connecting rod-piston assembly comprising a piston having a connecting rod mounted therein, an upper end of the connecting rod made to form a bowl-shaped element truncated along a width of the connecting rod, the upper end having outer and inner spherical surfaces having sphere centers arranged from an engine combustion chamber side of the piston, the piston having a partition in which a spherical cavity is defined, the spherical cavity having two spherical surfaces forming a slit, formed by two spherical surfaces, a first of the two spherical surfaces larger than a second of the two spherical surfaces, the two spherical surfaces having sidewalls on ends of the spherical cavity on a side of the partition, the two spherical surfaces having a central channel that opens a part of the spherical cavity to locate thereacross a connecting rod blade, the connecting rod-piston assembly characterized in that along the partition on a flank of the sidewalls from the first of the two spherical surfaces to a skirt side of the piston skirt side a bulkhead is provided, the bulkhead consisting of a part of the first of the two spherical surfaces and connecting the sidewalls and opposite parts of the of the first two spherical surfaces from a side of the partition, and partially lapping the central channel from the flank of the sidewalls, the central channel reinforced by a plate located at an end of the partition along a perimeter thereof, a groove of the plate into which a ring is provided embracing the partition together with the bulkhead and the sidewalls.

* * * * *